United States Patent

[11] 3,588,625

| [72] | Inventors | Yasukane Kihara<br>Tokyo;<br>Ushimatsu Moriyama, Fujisawa-shi; Yoichi Seta, Yokohama-shi, Japan |
|---|---|---|
| [21] | Appl. No. | 796,181 |
| [22] | Filed | Feb. 3, 1969 |
| [45] | Patented | June 28, 1971 |
| [73] | Assignee | Tokyo Shibaura Electric Co., Ltd.<br>Kawasaki-shi, Japan |
| [32] | Priority | Feb. 5, 1968 |
| [33] | | Japan |
| [31] | | 43/6716 |

[54] ELECTROLYTIC CONDENSER AND PASTE COMPOSITION THEREFOR
5 Claims, No Drawings

[52] U.S. Cl. .................................................. 317/230, 252/62.2
[51] Int. Cl. .................................................. H01g 9/02

[50] Field of Search ............................................ 252/62.2; 317/230, (Chemical Abstructs0

[56] References Cited
UNITED STATES PATENTS

| 3,302,071 | 1/1967 | Stahr | 252/62.2X |
| 3,351,823 | 11/1967 | Jenny | 252/62.2X |
| 3,487,270 | 12/1969 | Alwitt | 252/62.2X |

FOREIGN PATENTS

| 1,480,996 | 5/1967 | France | |

*Primary Examiner*—James E. Poer
*Assistant Examiner*—J. Cooper
*Attorney*—Kemon, Palmer and Estabrook ABSTRACT: A paste composition consisting of electrolyte compounds, boric acid polyesters of ethylene glycol and N-methyl-2-pyrrolidone. When used as an electrolyte for an electrolytic condenser, the composition furnishes said condenser with good electrical properties.

ELECTROLYTIC CONDENSER AND PASTE COMPOSITION THEREFOR

BACKGROUND OF THE INVENTION

The present invention relates to a paste composition used as an electrolyte for an electrolytic condenser.

The typical known paste composition for an electrolytic condenser is a mixture of electrolyte compounds of borates and ethylene glycol. The borate of the mixture is added in amounts in excess of the upper limit of its solubility in ethylene glycol in order to furnish the condenser with good withstand voltage properties and great readiness for formation. However, such a composition has the drawbacks that it presents an unduly great viscosity at normal temperature due to the presence of a super-saturated borate, presents difficulties in being impregnated in a porous intermediate layer interposed between the electrodes of the condenser and fails properly to act as an electrolyte because of its tendency to solidify at low temperatures. Other disadvantages of the known composition are, for example, that when used as an electrolyte in an electrolytic condenser, the composition degrates the electrical properties and capacity stability of said composition when it is left unloaded.

SUMMARY OF THE INVENTION

The present invention provides a paste composition for an electrolytic condenser consisting of electrolyte compounds, N-methyl-2-pyrrolidons and boric acid polyesters of ethylene glycol soluble in said N-methyl-2-pyrrolidone. It has been found that this paste composition does not solidify at appreciably low temperatures of −35° C. or lower, but is capable of forming a good electrode. Further, an electrolytic condenser formed of the composition is extremely stable to temperature variations and displays no noticeable change in its capacity even when it is left unloaded for long hours.

DETAILED DESCRIPTION OF THE PREFERRED EMBODIMENTS

Electrolyte compounds available for preferable use in the paste composition of the present invention for an electrolytic condenser include one or more of boric acid, boric anhydride and borates such as ammonium tetraborate, ammonium pentaborate and barium hexaborate; phosphates such as potassium dihydrogen phosphate and zinc pyrophosphate; carbonates such as ammonium carbonate and magnesium bicarbonate; arsenates such as lithium dihydrogen arsenate and aluminum arsenate; sulfates such as tributyl ammonium sulfate and sodium hydrogen sulfate; acetates such as cadmium acetate and barium acetate; malonates such as lithium hydrogen malonate and diammonium malonate; aliphatic carboxylates such as magnesium acrylate, trimethylammonium maleate, ammonium tartrate and sodium cyanoacetate; aromatic carboxylates such as potassium benzoate, sodium hydrogen phthalate, and strontium salicylate; sulfonates such as magnesium ethane sulfonate, aluminum benzenesulfonate and sodium α-naphthalenesulfonate; phenolates such as sodium phenolate, dilithium resorcinate and zinc picramate; aliphatic amines such as ethylamine, ethylene diamine, digutylamine and triethanolamine; aromatic amines such as aniline, pyridine, indolate and melamine; and alkoxides such as sodium ethoxide, potassium isopropoxide, and zinc ter-butoxide.

The boric acid polyesters of ethylene glycol used in the paste composition of the present invention may be prepared by subjecting boric acid or boric anhydride and ethylene glycol to dehydration and condensation reaction at a temperature of, for example, 90° to 180° C and preferably in the presence of a catalyst. The molecular weight of the polymer obtained is distributed between about 700 and about 750,000 in accordance with the proportions of the starting materials and reaction conditions involved. Where boric acid is used, it is preferably mixed with ethylene glycol in the molar ratio of about 1:1 or about 2:1. The molar ratio of boric anhydride to ethylene glycol is about 1:1. Ratios widely departing from the aforementioned limits are likely to generate a polymer insoluble in N-methyl-2-pyrrolidone, and such polymer is unavailable for use in the present invention. The water which is produced with the progress of condensation reaction of boric acid or boric anhydride with ethylene glycol should be removed by heating the reaction product. The reason is that the presence of water reduces the stability of the paste composition at temperatures of less than 0° C. If an organic solvent such as toluene is added to the reaction mixture, followed by heating, then the elimination of water will be more easily effected due to the azeotropy of water with toluene.

The paste composition of the present invention consists of the boric acid polyesters of ethylene glycol and the above-listed electrolyte compounds dissolved in N-methyl-2-pyrrolidone. The N-methyl-2-pyrrolidone itself has a favorable nature as the solvent component of an electrolyte and is capable of dissolving the electrolyte compounds and polyester polymers. This pyrrolidone is the only material available at present for the purpose of the present invention. While there is no particular limitation on the proportions of the components of the paste composition of the present invention, experiments confirm that the following proportions are preferable.

Electrolyte compounds  0.5 to 30 parts by weight
Boric acid polyesters of ethylene glycol  2 to 89.5 parts by weight
N-methyl-2-pyrrolidone  10 to 95 parts by weight The paste composition of the present invention is chemically stable and not easily affected by temperature variations. For instance, when left unloaded 1,000 hours at a temperature of 80° C., the composition did not display any change in its pH, viscosity and specific resistivity, resulting in no occurrence of precipitates. Further, experiments show that when left unloaded for long a condenser using this composition as an electrolyte exhibits far less variations in the capacity and leakage current than the one prepared from the prior art composition. Such favorable properties of the paste composition of the present invention will naturally help to obtain an electrolytic condenser displaying better performance than has been possible with the conventional paste composition.

Further characteristics and concrete advantage of the present invention will be more fully appreciated from the specific examples which follow.

EXAMPLE 1

There were prepared in accordance with the recipe given in the table below 20 different polyester polymers of ethylene glycol.

| Polymer No. | Boric acid, g. | Ethylene glycol, g. | Azeotropy with butanol | | | Average molecular weight of reaction product |
| | | | Reaction conditions | | | |
| | | | Temperature, ° C. | Pressure, mm. Hg | Water removed, g. | |
|---|---|---|---|---|---|---|
| 1 | 31.5 | 68.5 | 180 | 760 | 27.4 | 790 |
| 2 | 31.5 | 68.5 | 140 | 760 | 27.4 | 750 |
| 3 | 31.5 | 68.5 | 100 | 50 | 27.4 | 810 |
| 4 | 31.5 | 68.5 | 93 | 760 | 27.4 | 760 |
| 5 | 33.1 | 66.9 | 180 | 760 | 28.8 | 1,650 |

|  |  |  | Azeotropy with butanol | | | |
|---|---|---|---|---|---|---|
|  |  |  | Reaction conditions | | | |
| Polymer No. | Boric acid, g. | Ethylene glycol, g. | Temperature, °C. | Pressure, mm. Hg | Water removed, g. | Average molecular weight of reaction product |
| 6 | 33.1 | 66.9 | 140 | 760 | 28.8 | 2,200 |
| 7 | 33.1 | 66.9 | 100 | 50 | 28.8 | 2,000 |
| 8 | 33.1 | 66.9 | 93 | 760 | 28.8 | 1,800 |
| 9 | 33.4 | 66.6 | 180 | 760 | 29.0 | 7,500 |
| 10 | 33.4 | 66.6 | 140 | 760 | 29.0 | 8,400 |
| 11 | 33.4 | 66.6 | 100 | 50 | 29.0 | 13,000 |
| 12 | 33.4 | 66.6 | 93 | 760 | 29.0 | 8,000 |
| 13 | 50.0 | 50.0 | 180 | 760 | 29.0 | 44,000 |
| 14 | 50.0 | 50.0 | 140 | 760 | 29.0 | 75,000 |
| 15 | 50.0 | 50.0 | 100 | 50 | 29.0 | 35,000 |
| 16 | 50.0 | 50.0 | 93 | 760 | 29.0 | 60,000 |
| 17 | 54.0 | 46.0 | 180 | 760 | 26.6 | 1,050 |
| 18 | 54.0 | 46.0 | 140 | 760 | 26.6 | 1,000 |
| 19 | 54.0 | 46.0 | 100 | 50 | 26.6 | 1,200 |
| 20 | 54.0 | 46.0 | 93 | 760 | 26.6 | 1,100 |

The polymers thus prepared were all soluble in N-methyl-2-pyrrolidone.

To some selected ones of these polymers were added electrolyte compounds and N-methyl-2-pyrrolidone to prepare eight different samples of a paste composition of the present invention. Determination was made of the pH, static viscosity, stability at high and low temperatures and breakdown voltage of each sample. Determination of a breakdown voltage was made by immersing in 50 cc. of the sample three aluminum foils 99.99 percent pure, 100 microns thick and 10 cm.$^2$ in surface area which has been washed with water, degreased and cleaned with alcohol, followed by drying and arranged at a space of 15 mm. in parallel relationship, and carrying out constant current formation at a current density of 50 ma./dm.$^2$ with the central foil used as an anode and those on both sides thereof as a cathode.

There were further prepared eight different condensers from the aforesaid eight different samples. Determination was made with each condenser of the reduction of the static capacity, dielectric loss and variations in the static capacity and the equivalent series resistance after the condenser was left unloaded 1,000 hours at a temperature of 85° C. The condenser was prepared in the order of the following steps. There was formed a cylindrical body consisting of an anode made of an aluminum foil 99.99 percent pure, 50 mm. wide, 950 mm. long, 94 microns thick and having a static capacity of 8.2 micro F/dm.$^2$ which, after etching treatment, had been subjected to constant current formation in an aqueous solution of ammonium borate until 600 volts were reached, a cathode made of an aluminum foil 99.99 percent pure, 50 mm. wide, 1,000 mm. long and 50 microns thick, and an intermediate layer interposed between both poles which comprised a sheet of high density kraft paper 65 mm. wide, 1,100 mm. long and 45 microns thick and a sheet of medium density kraft paper 65 mm. wide, 1,100 mm. long and 20 microns thick. After being dried 1 hour at a temperature of 60° C. and a pressure of 1 mm. Hg, the cylindrical body was immersed 4 hours in a sample paste composition at 60° C. at a pressure of 20 mm. Hg. The anode and cathode were fitted with a terminal and the cylindrical body was wound with kraft paper for insulation. Then the cylindrical body was housed in an aluminum envelope which was closed at one end and had an insulation layer of pitch formed at said closed end. The open end of the envelope was encapped with a plate of insulating material in such a manner that the aforementioned anode and cathode terminals projected outside.

The recipe and properties of the respective paste compositions and the properties of the condensers prepared therefrom are presented in the table below.

|  | Sample | | | | | | | |
|---|---|---|---|---|---|---|---|---|
|  | 1 | 2 | 3 | 4 | 5 | 6 | 7 | 8 |
| Polymer, wt. percent | 60 | 70 | 50 | 15 | 39.5 | 4 | 15 | 80 |
| No. | (1) | (2) | (6) | (7) | (9) | (12) | (14) | (17) |
| N-methyl-2-pyrrolidone, wt. percent | 35 | 20 | 40 | 70 | 60 | 90 | 75 | 17 |
| Electrolyte compounds, wt. percent | [1] 5 | [2] 10 | [3] 10 | [4] 15 | [5] 0.5 | [6] 6 | [7] 10 | [8] 3 |
| pH, 25° C. |  | 5.8 | 5.5 | 6.1 | 5.7 |  | 6.3 | 5.0 |
| Static viscosity, cps., 25° C. | 100 | 168 | 158 | 76 | 303 | 36 | 84 | 252 |
| High temperature stability, 85° C., 1,000 hrs. | No change in pH, specific resistivity and viscosity and no occurrence of precipitates. | | | | | | | |
| Low temperature stability, −35° C., 120 hrs. | (No solidification and no occurrence of precipitates.) | | | | | | | |
| Breakdown voltage, V | 595 | 610 | 680 |  | 630 |  | 650 | 625 |
| Reduction of static capacity due to impregnation, percent | 15 | 18 | 22 | 13 | 24 | 9 | 15 | 19 |
| Dielectric loss, 120 c./s., 25° C. |  | 0.05 | 0.03 | 0.04 | 0.05 |  | 0.02 | 0.04 |
| Variations in static capacity, percent, 85° C., 1,000 hrs. | 1.0 | 2.0 | 1.0 |  | −1.0 |  | 5.0 | 1.0 |
| Equivalent series resistance, Ω, −30° C. |  | 2.8 |  | 0.4 | 1.2 |  | 0.9 |  |

[1] Cadmium acetate.
[2] Barium hexaborate.
[3] Tetramethylammonium dihydrogen phosphate.
[4] Zinc picrate.
[5] Potassium benzoate.
[6] Ammonium tartrate.
[7] Trimethylammonium maleate.
[8] Ethylamine.

EXAMPLE 2

There were prepared in accordance with the recipe given in the table below 12 different boric acid polyester polymers of ethylene glycol. These polymers were all soluble in N-methyl-2-pyrrolidone.

| Polymer No. | Boric anhydride, g. | Ethylene glycol, g. | Reaction conditions Temperature, °C. | Reaction conditions Pressure, mm. Hg | Water removed, g. | Average molecular weight of reaction product |
| --- | --- | --- | --- | --- | --- | --- |
| 21 | 20.3 | 79.7 | 180 | 760 | 15.7 | 750 |
| 22 | 20.3 | 79.7 | 140 | 760 | 15.7 | 710 |
| 23 | 20.3 | 79.7 | 100 | 50 | 15.7 | 800 |
| 24 | 20.3 | 79.7 | 93 | 760 | 15.7 | 740 |
| 25 | 21.9 | 78.1 | 180 | 760 | 16.9 | 220,000 |
| 26 | 21.9 | 78.1 | 140 | 760 | 16.9 | 750,000 |
| 27 | 21.9 | 78.1 | 100 | 50 | 16.9 | 355,000 |
| 28 | 21.9 | 78.1 | 93 | 760 | 16.9 | 601,000 |
| 29 | 21.5 | 78.5 | 180 | 760 | 16.5 | 2,900 |
| 30 | 21.5 | 78.5 | 140 | 760 | 16.5 | 2,500 |
| 31 | 21.5 | 78.5 | 100 | 50 | 16.5 | 3,100 |
| 32 | 21.5 | 78.5 | 93 | 760 | 16.5 | 2,700 |

To some selected ones of the polymers prepared were added electrolyte compounds and N-methyl-2-pyrrolidone to form seven different sample paste compositions. There were further fabricated seven different electrolytic condensers using each of said samples in the same manner as in Example 1. Determination was made of the properties of the resultant condensers. The table below gives the recipe and properties of each paste composition and the properties of each electrolytic condenser.

| | Sample 9 | 10 | 11 | 12 | 13 | 14 | 15 |
| --- | --- | --- | --- | --- | --- | --- | --- |
| Polymer, wt. percent | 67 | 55 | 2 | 35 | 24 | 10 | 85 |
| No. | (21) | (22) | (25) | (26) | (27) | (29) | (31) |
| N-methyl-2-pyrrolidone, wt. percent | 30.5 | 15 | 95 | 45 | 66 | 82 | 10 |
| Electrolyte compounds, wt. percent | [1]2.5 | [2]30 | [3]3 | [4]20 | [5]10 | [6]8 | [7]5 |
| pH, 250° C | 5.3 | | | 6.4 | 6.1 | 6.5 | 4.9 |
| Static viscosity, cps., 25° C | 114 | 181 | 27 | 472 | 286 | 38 | 540 |
| High temperature stability, 85° C., 1,000 hrs. | (No change in pH, specific resistivity and viscosity and no occurrence of precipitates.) | | | | | | |
| Low temperature stability, −35° C., 120 hrs. | (No solidification and no occurrence of precipitates.) | | | | | | |
| Breakdown voltage, V | 650 | 590 | | 720 | 680 | | 620 |
| Reduction of static capacity due to impregnation, percent | 16 | | 7 | 23 | 19 | 9 | |
| Dielectric loss, 120 c./s., 25° C | 0.03 | | 0.05 | 0.02 | 0.03 | 0.04 | |
| Variations in static capacity, percent 85° C., 1,000 hrs. | 3.0 | | | 2.0 | | −0.1 | |
| Equivalent series resistance, Ω, −35° C | 1.8 | | 0.2 | | 2.8 | 0.4 | |

[1] Calcium isoproxide.
[2] Pyridine.
[3] Diammonium malonate.
[4] Lithium dihydrogen arsenate.
[5] Aluminum benzene-sulfonate.
[6] Magnesium acrylate.
[7] Ammonium carbonate.

We claim:
1. A paste composition for an electrolytic condenser consisting essentially of 0.5 to 30 weight percent electrolyte compound, 10 to 95 weight percent N-methyl-2-pyrrolidone and 2 to 89.5 weight percent of boric acid polyesters of ethylene glycol having a molecular weight between about 700 and 750,000 and soluble in N-methyl-2-pyrrolidone, said electrolyte compound being selected from the group consisting of boric acid, boric anhydride, salts of boric, phosphoric, pyrophosphoric, carbonic, arsenic, sulfuric, acetic, malonic, acrylic, maleic, tartaric, cyanoacetic, benzoic, phthalic, salicylic, alkyl sulfonic, and arylsulfonic acids, phenolates, aliphatic amines, aromatic amines and alkoxides.

2. A paste composition of claim 1 wherein said electrolyte compound is selected from the group consisting of boric acid, boric anhydride, ammonium tetraborate, ammonium pentaborate, barium hexaborate, potassium dihydrogen phosphate, zinc pyrophosphate, ammonium carbonate, magnesium bicarbonate, lithium dihydrogen arsenate, aluminum arsenate, tributyl ammonium sulfate, sodium hydrogen sulfate, cadmium acetate, barium acetate, lithium hydrogen malonate, diammonium malonate, magnesium acrylate, trimethyl ammonium maleate, ammonium tartrate, sodium cyanoacetate, potassium benzoate, sodium hydrogen phthalate, strontium salicylate, magnesium ethane sulfonate, aluminum benzene-sulfonate, sodium alpha-naphthalenesulfonate, sodium phenolate, dilithium resorcinate, zinc picramate, ethylamine, ethylene diamine digutylamine, triethanolamine, aniline, pyridine, indolate, melamine, sodium ethoxide, potassium isopropoxide and zinc butoxide.

3. A paste composition according to claim 1 wherein the boric acid polyesters of ethylene glycol are the condensation product of ethylene glycol and boric acid.

4. A paste composition according to claim 1 wherein the boric acid polyesters of ethylene glycol are the condensation product of ethylene glycol and boric anhydride.

5. An electrolytic condenser comprising a pair of aluminum foil electrodes, a porous layer interposed between said electrodes, a paste composition impregnated in said porous layer, an envelope housing said electrodes, porous layer and paste composition and terminals fitted to each of said electrodes to project outside said envelope, said paste composition consisting essentially of 0.5 to 30 weight percent electrolyte compound, 10 to 95 weight percent N-methyl-2-pyrrolidone and 2 to 89.5 weight percent of boric acid polyesters of ethylene glycol having a molecular weight between about 700 and 750,000 and soluble in N-methyl-2-pyrrolidone, said electrolyte compound being selected from the group consisting of boric acid, boric anhydride, salts of boric, phosphoric, pyrophosphoric, carbonic, arsenic, sulfuric, acetic, malonic, acrylic, maleic, tartaric, cyanoacetic, benzoic, phthalic, salicylic, alkyl sulfonic, and arylsulfonic acids, phenolates, aliphatic amines, aromatic amines and alkoxides.